(12) United States Patent
Mellor

(10) Patent No.: US 7,717,795 B2
(45) Date of Patent: May 18, 2010

(54) LOW VIBRATION NOISE FLEXIBLE SHAFT

(75) Inventor: Paul Michael Mellor, Easton, PA (US)

(73) Assignee: S.S. White Technologies Inc., Piscataway, NJ (US)

( * ) Notice: Subject to any disclaimer, the term of this patent is extended or adjusted under 35 U.S.C. 154(b) by 569 days.

(21) Appl. No.: 11/427,890

(22) Filed: Jun. 30, 2006

(65) Prior Publication Data
US 2008/0004123 A1  Jan. 3, 2008

(51) Int. Cl.
*F16C 1/08* (2006.01)

(52) U.S. Cl. .......... 464/181; 464/51

(58) Field of Classification Search .......... 464/52–53, 464/179–183, 89, 51; 297/330, 344.17, 344.2, 297/362.11; 403/229; 74/500.5, 502.4, 502.5
See application file for complete search history.

(56) References Cited

U.S. PATENT DOCUMENTS

| | | | |
|---|---|---|---|
| 3,257,863 A * | 6/1966 | Hanson | 74/502.5 |
| 3,473,060 A * | 10/1969 | Powell | |
| 3,481,156 A * | 12/1969 | Decsipkes | 464/52 |
| 4,020,651 A * | 5/1977 | Callies | |
| 4,541,160 A * | 9/1985 | Roberts | 464/182 |
| 4,667,530 A * | 5/1987 | Mettler et al. | 464/89 |
| 4,915,340 A | 4/1990 | Nawa | |
| 5,246,270 A * | 9/1993 | Vogel | |
| 5,383,811 A * | 1/1995 | Campbell et al. | 464/89 |
| 5,798,181 A * | 8/1998 | Hobson et al. | |
| 5,906,543 A * | 5/1999 | Jones | 464/180 |
| 6,309,019 B1 * | 10/2001 | Downey et al. | 297/344.17 |
| 6,860,538 B2 * | 3/2005 | Muller et al. | |

* cited by examiner

*Primary Examiner*—Greg Binda
(74) *Attorney, Agent, or Firm*—Arthur L. Lessler

(57) ABSTRACT

A flexible shaft having ends of square cross-section for coupling a mating female driving member such as a square recess in a motor assembly, with a mating female driven member such as a square recess in a gearbox assembly, for positioning a seat in a motor vehicle. To decrease vibration and noise due to friction and relative movement between the shaft ends and the mating recesses, the sides of the shaft end portions are covered with a deformable polytetrafluoroethylene sheath applied by positioning a length of heat shrinkable tubing over each end portion and heating the tubing to shrink it onto the corresponding end portion so that it assumes the square cross-sectional shape of the end portion.

13 Claims, 1 Drawing Sheet

LOW VIBRATION NOISE FLEXIBLE SHAFT

BACKGROUND OF THE INVENTION

The present invention relates to a flexible shaft exhibiting reduced noise and vibration characteristics and is especially useful for, but not limited to a flexible shaft which couples a motor to a gear assembly for positioning an adjustable seat in a motor vehicle.

In automotive seat positioning systems currently in use, a drive motor is equipped with a female drive member typically having a square recess for receiving one square end of a flexible shaft. The opposite end of the flexible shaft is also square and engages a similar recess in a gearbox assembly which converts rotary motion to linear motion (for example, forward, rearward, upward, and downward) to move the seat accordingly.

In an effort to improve perceived value, the automotive industry strives for reduction of harshness due to noise and vibration, including buzz, squeak and rattle noise when the seat is moved.

Noise and vibration in the aforementioned seat adjustment mechanism is contributed to by relative movement and accompanying friction between the ends of the flexible shaft and the recesses with which those ends mate. Such relative movement is reduced by forming the shaft ends in a helical square configuration so that they more tightly engage the mating recesses, as taught by U.S. Pat. No. 6,464,588.

However, in order for the helical square shaft ends to significantly reduce vibration and noise the mating recesses must be dimensioned to rather close tolerances which are not always realized in production seat assemblies.

The use of nylon coatings on the flexible shafts ends to prevent metal to metal contact and thereby reduce friction and resulting vibration and noise is known in the art. Such coatings, however, have not proven to provide satisfactory performance in applications which are not of a light duty nature.

For a number of years flexible shaft end coatings have been applied utilizing electrostatic grade nylon 11 powder. A "volumized bed" or thermal coating process applies a thin (approximately 0.003 inches) layer of the nylon powder to the flexible shaft ends. The shaft is first heated to a specific temperature and then passed through a cloud of the powder, to partially melt the powder and fuse it to the flexible shaft ends. The resulting coating prevents direct metal to metal contact and reduces gaps between the shaft ends and mating recesses, reducing vibration and noise. However, over time the thickness of the coating is reduced due to mechanical working and wear, and noise levels increase.

Accordingly, an object of the present invention is to provide a flexible shaft exhibiting reduced vibration and noise over a long period of time and suitable for coupling to mating recesses having less tight tolerances; that is, a relatively wide variation from the nominal dimensions thereof.

SUMMARY OF THE INVENTION

As herein described, there is provided a flexible shaft and method for manufacturing the same. The shaft has end portions of noncircular cross-section for coupling a female driving member having a noncircular recess for mating with one noncircular end portion of the shaft, with a female driven member having a noncircular recess for mating with the other noncircular end portion of the shaft. The sides of the shaft end portions are covered with a deformable thermoplastic sheath which may be applied by positioning a length of heat shrinkable tubing over each shaft end portion and heating the tubing to shrink it onto the corresponding end portion so that it assumes the cross-sectional shape of the end portion. Alternatively, the sheath may constitute a thermosetting plastic material.

IN THE DRAWING

DETAILED DESCRIPTION

Figure 1:
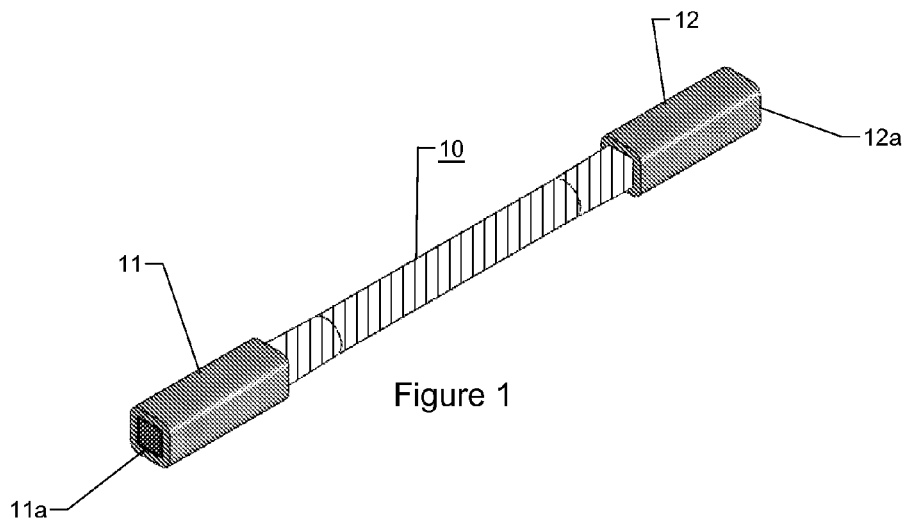
FIG. 1 is an isometric view of a flexible shaft according to a preferred embodiment of the invention.
Figure 2:
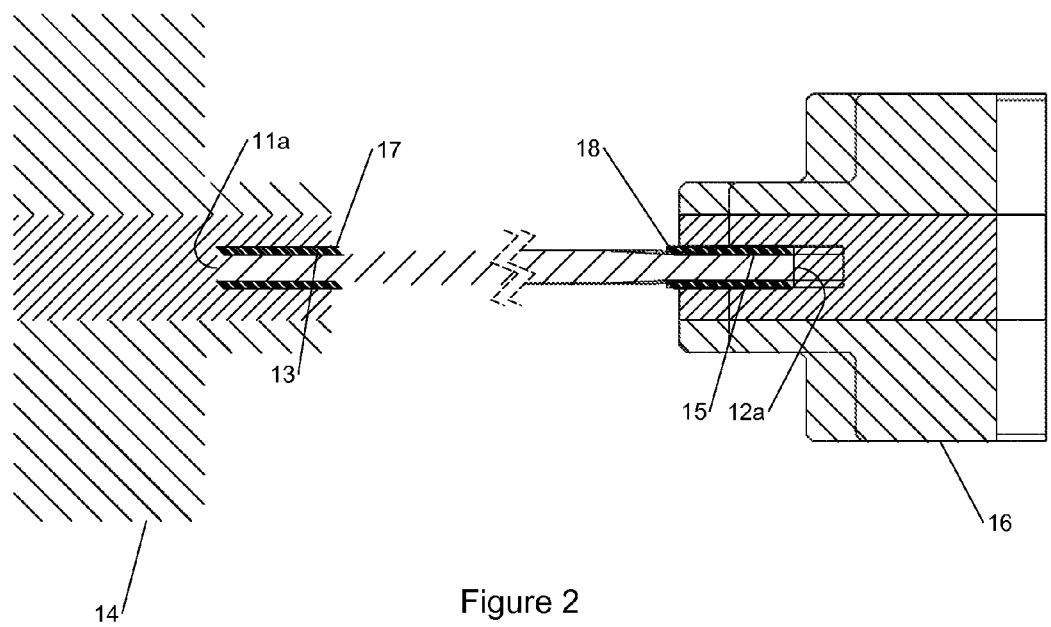
FIG. 2 is a front elevation cross-sectional view of the flexible shaft of FIG. 1, coupled at its left end to a mating recess of a drive motor assembly and at its right end to a mating recess of a seat adjusting gear box assembly.

As shown in FIGS. 1 and 2, a flexible shaft 10 has a left end portion 11 and a right end portion 12, each of which end portions has flat sides and a square (or helical square) cross-section. The end portion 11 has a square end surface 11a and the end portion 12 has a square end surface 12a. Typically, for a seat adjustment mechanism, according to the prior art each square end surface 11a, 12a has edge dimensions of about 0.120 to 0.124 inches, as compared with dimensions according to a preferred embodiment of the present invention in the range of 0.101 to 0.104 inches.

The left end 11 of the shaft 10 is adapted to mate with a recess 13 in a drive motor assembly element 14. The right end 12 of the shaft 10 is adapted to mate with a recess 15 in a gear box assembly element 16. Each of the recesses has a square cross-section with side dimensions typically in the range of 0.125 inches to 0.130 inches.

According to the present invention a deformable plastic sheath 17 is applied to the left end 11 of the flexible shaft 10, and another deformable plastic sheath 18 is applied to the right end 12 of said shaft.

Each sheath is preferably made of heat shrinkable polytetrafluoroethylene tubing cut to the appropriate length. While such tubing has been applied to the intermediate portion of a flexible shaft for a number of years in order to reduce friction between the major portion of the shaft and a surrounding casing, to inventor's knowledge there has been no application of such tubing to the square ends of a flexible shaft to utilize the deformability characteristic of the material to fill any gap between the shaft end and the mating recess and provide a vibration damping effect, as well as to utilize the low surface friction coefficient of the material to reduce coupling vibration and noise, as is done according to the present invention.

To provide the aforementioned sheaths, a shaft having square ends of 0.104 inch dimension as described above was used, and pieces of Teflon® heat shrinkable tubing were placed over the shaft ends. The tubing had a recovered (i.e., after shrinking) wall thickness of 0.012±0.003 inches. The shaft ends were then heated by placing the shaft in an oven at a temperature and for a time sufficient to cause the tubing to shrink onto and adhere to the shaft ends, so that the outer surface of each sheath assumes the shape of the corresponding end portion. Alternatively, a high thermal capacity hot air gun may be used to shrink the tubing.

The sheath at each end of the shaft is preferably unitary; that is, formed from a single length of plastic. The sheath at one end of the shaft may of course be made from a length cut from a different piece of tubing than the length used to form the sheath at the other end of the shaft.

In tests of a seat adjustment mechanism utilizing the flexible shaft with polytetrafluoroethylene sheath covered ends as described above, a substantial reduction in vibration noise was exhibited.

The use of plastic sheath ends as described above also minimizes electrical contact between the flexible shaft ends and the mating recesses, which may be made of different metals, and thus reduces the risk of electrochemical corrosion at the interface between the shaft ends and the mating recesses.

While polytetrafluoroethylene has been found to be the preferred plastic material for use in the arrangement of the present invention, other thermoplastic materials or thermosetting plastic materials may alternatively be used.

The deformability of the sheath material allows it to mold itself to the shape of the gap between the shaft ends and the mating recesses, thus contributing to the reduction of vibration and noise due to relative movement between the shaft ends and the recesses.

The plastic sheaths cover the sides of the end portions 11 and 12 but do not cover the exposed end surfaces 11a and 12a thereof. However, since any relative movement between the end surfaces and the mating recesses would not involve significant rubbing of the end surfaces against any adjacent recess surface, the vibration and noise reducing effect of the seat adjusting mechanism is not adversely affected.

The flexible shaft arrangement herein described may be used to couple other driving members to other driven members and is not limited to seat adjusting mechanisms.

While flexible shaft end portions and mating recesses of square cross-section are described herein, other noncircular end portion and mating recess configurations may be employed.

I claim:

1. A flexible shaft for transmitting torque, said shaft having end portions of noncircular cross-section for coupling a female driving member having a noncircular recess adapted to mate with one noncircular end portion of the shaft, with a female driven member having a noncircular recess adapted to mate with the other noncircular end portion of the shaft, the sides of each of the shaft end portions comprising a deformable outermost thermoplastic sheath adapted to undergo deformation upon engagement of the sheath with a mating recess so as to mold itself to the shape of the gap between the shaft end portion and the mating recess, thus reducing vibration and noise due to relative movement between the shaft end portions and the mating recesses.

2. The shaft according to claim 1, wherein each of said sheaths is adherent to and surrounds the corresponding end portion and has an outer surface having essentially the same shape as the corresponding end portion.

3. The shaft according to claim 1, wherein said sheath comprises polytetrafluoroethylene.

4. A flexible shaft for transmitting torque, said shaft having end portions of noncircular cross-section for coupling a female driving member having a noncircular recess adapted to mate with one noncircular end portion of the shaft, with a female driven member having a noncircular recess adapted to mate with the other noncircular end portion of the shaft, each of said end portions being surrounded by a deformable outermost thermoplastic unitary sheath adapted to undergo deformation upon engagement with a mating recess so as to mold itself to the shape of the gap between the shaft end portion and the mating recess, thus reducing vibration and noise due to relative movement between the shaft end portion and the mating recess.

5. The shaft according to claim 4, wherein each sheath is adherent to the corresponding end portion of the shaft.

6. The shaft according to claim 4, wherein each sheath comprises polytetrafluoroethylene.

7. The shaft according to claim 4 wherein each end portion has a square cross-section and each sheath is adherent to the adjacent end portion.

8. The shaft according to claim 7, wherein each sheath comprises polytetrafluoroethylene.

9. A flexible shaft for transmitting torque, said shaft having end portions of square cross-section for coupling a mating female driving member comprising a square recess in a motor assembly, with a mating female driven member comprising a square recess in a gearbox assembly, for positioning a seat in a motor vehicle, the sides of the shaft end portions comprising a deformable outermost thermoplastic unitary sheath adapted to undergo deformation upon engagement of the sheath with a mating recess so as to mold itself to the shape of the gap between the shaft end portion and the mating recess, thus reducing vibration and noise due to relative movement between the shaft end portion and the mating recess.

10. The shaft according to claim 9, wherein said thermoplastic is polytetrafluoroethylene.

11. A flexible shaft for transmitting torque, said shaft having at least one metal end portion of noncircular cross-section surrounded by an outermost adherent deformable thermoplastic unitary sheath having an outer surface essentially conforming to the shape of the end portion and adapted to undergo deformation upon engagement of the sheath with a mating recess so as to mold itself to the shape of the gap between the shaft end portion and the mating recess, thus reducing vibration and noise due to relative movement between the shaft end portion and the mating recess.

12. The shaft according to claim 11, wherein said thermoplastic is polytetrafluoroethylene.

13. A flexible shaft for transmitting torque, said shaft having end portions of noncircular cross-section for coupling a female driving member having a noncircular recess adapted to mate with one noncircular end portion of the shaft, with a female driven member having a noncircular recess adapted to mate with the other noncircular end portion of the shaft, the sides of each of the shaft end portions constituting a deformable outermost sheath comprising a thermosetting plastic material adapted to undergo deformation upon engagement of the sheath with a mating recess so as to mold itself to the shape of the gap between the shaft end portion and the mating recess, thus reducing vibration and noise due to relative movement between the shaft end portion and the mating recess.

* * * * *